Figure 2:
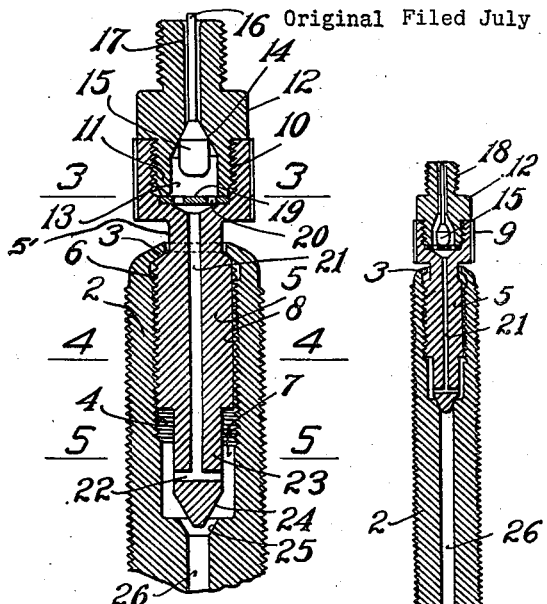

Sept. 18, 1923.

C. R. C. BORDEN

VALVE

Original Filed July 17, 1916

1,468,273

WITNESSES
Victoria Lowden
Agnes V. O'Connell

INVENTOR
CHARLES R. C. BORDEN
BY
Ellis Spear Jr.
ATTY.

Patented Sept. 18, 1923.

1,468,273

UNITED STATES PATENT OFFICE.

CHARLES R. C. BORDEN, OF BROOKLINE, MASSACHUSETTS.

VALVE.

Application filed July 17, 1916, Serial No. 109,777. Renewed August 12, 1919. Serial No. 317,064.

*To all whom it may concern:*

Be it known that I, CHARLES R. C. BORDEN, a citizen of the United States, residing at Brookline, county of Norfolk, Commonwealth of Massachusetts, have invented certain new and useful Improvements in Valves, of which the following is a specification.

This invention relates to valves, and particularly to a valve for controlling the inflation of a pneumatic tube such as the inner tube of an automobile or bicycle tire or the air bag used in connection with the manufacture of such tires.

The object of my invention, generally stated, is to provide a valve of this class which will afford a more perfect control of the pressure, particularly as regards leakage. With the ordinary tire valve, the tendency of the pressure is to leak past the screw threaded connection between the valve spindle and stem when the usual needle valve on said spindle is unseated to permit inflation of the tube. My invention contemplates the provision of an air-tight seal above the needle valve to prevent escape of this pressure past the screw threads.

In its simplest form, this seal may be effected by reducing the valve spindle above the screw threads to provide an annular groove terminating in a tapered shoulder and by turning in the upper end of the stem to enter said groove and abut the tapered shoulder when the spindle is retracted to unseat the needle valve. This provides an outwardly opening retaining valve at the outer end of the spindle which closes to seal the screw threads when the needle valve at the lower end of the spindle is opened to permit inflation of the tube.

Figure 1:
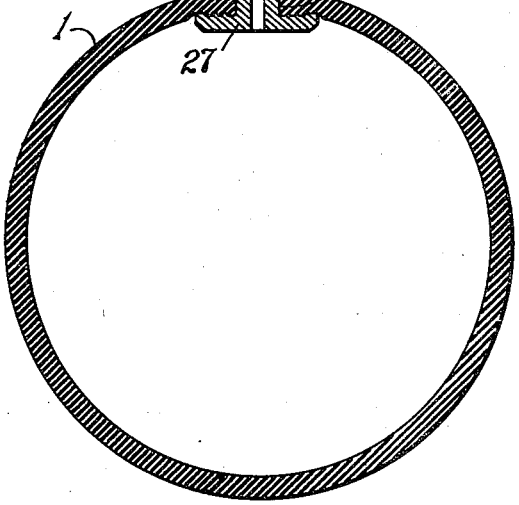

The construction and operation of my device will be more fully disclosed in the specification that follows: In the drawings forming a part of that specification I have shown as an illustrative embodiment a form of valve which has been found satisfactory in use and well adapted to the requirements of manufacture. Throughout specification and drawings like reference numerals are correspondingly applied, and in these drawings:

Fig. 1 is a central vertical section though a valve in accordance with my invention applied to the inner tube of an automobile tire.

Figure 3:
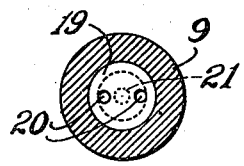
Figure 4:
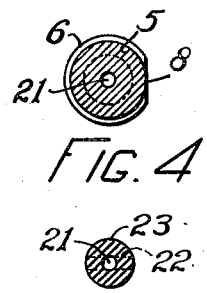
Figure 5:

Fig. 2 is an enlarged detail of the upper portion of the valve stem and associated parts, and Figs. 3, 4, and 5 are transverse sections on the lines 3—3, 4—4 and 5—5 respectively of Fig. 2.

I have indicated at 1 the usual inner tire tube attached to a stem 2 of the usual external appearance. The lower end of the stem 2 is reduced as indicated at 27' to permit the stem to be entered through the stem opening of the inner tube. The stem terminates at this end in a flat base 27 which clamps the stem against the internal face of the tube 1. The stem is clamped against the external face of the tube by a washer 28' loose on the stem. The washer is compressed against the tube by a pair of faced-off lock nuts 28 and a superimposed knurled lock nut 29 threaded on the stem.

The upper end of the stem 2 has an enlarged bore 7 connecting with the interior of the tire tube 1 by a longitudinal air passage 26. The bore 7 is threaded internally at 4 for the greater part of its length to receive the external threads 6 on the spindle 5 of needle valve adjustable in said bore. Where used as a tire valve, the threads 6 are cut away at one side of the spindle as indicated at 8, Fig. 4, for substantially the length of the spindle to provide an external longitudinally disposed air passage through which the air in the tire may pass when it is desired to quickly deflate the tire.

The spindle 5 is reduced adjacent to the upper end of the stem 2 as indicated at 5'. This provides a groove encircling the spindle and of sufficient breadth to permit opening and closing of the valve. The groove terminates at its lower edge in a tapered shoulder 5ª. The upper end of the stem is inturned as indicated at 3 to enter said groove and abut said tapered shoulder 5ª when the spindle is retracted. This prevents complete withdrawal of the spindle.

The spindle 5 is knurled as at 9 externally to facilitate rotation. The upper open end of the spindle 5 is internally threaded at 10 to receive the check valve which consists of a seat member threaded at 11 and extended up to form a connecting nipple 18 below which is a faced off portion for engagement by a wrench. Within the open end of the needle valve stem 5 is set a packing disc 19 which is compressed against the seat in the lower end of the stem by the lower end of the check valve seat 12. The disc 19 is eccentrically perforated as indicated at 20, Fig. 3. The tapered check valve 15 is adapted to find its seat at 14 and seal the air passage 17 when the tire is inflated and hold the back pressure. The valve 15 normally rests on the disc 19 with its pin or stem 16 fitting the air passage 17, but never seals the eccentric perforations 20.
The perforations 20 of the disc 19 with the longitudinal air passage 21 and the intersecting transverse air passage 22 of the needle valve 5 and the longitudinal passage 26 of the stem 2 put the valve chamber 13 into communication with the inner tube 1 when the needle valve is unseated. The passage 22 is formed in the lower reduced end 23 of the spindle 5 and connects at each end with the lower end of the bore 7. Below this passage 22 the spindle terminates in a conical end 24 adapted to find its seat on an outwardly bevelled shoulder 25 which constitutes a flared inlet for the passage 26 of the stem 2. The conical end 24 is normally adapted to close the passage 26 and prevent escape of the pressure contained in the tire.

In use when it is desired to inflate the tire, the pump connection is made with the end 18 of the valve seat. The needle valve 5 is then screwed up by turning the sleeve 9 a limited distance to unseat the conical end 24 and open up the passage 26. This movement of the spindle brings the tapered shoulder 5ᵃ at the lower edge of the groove 5' against the inturned portion 3 of the stem 2, so as to effect a substantially air tight seal at the outer end of spindle above the screw threads 6 to prevent leakage of the pressure past said threads. The shoulder 5ᵃ and inturned portion 3 thus constitute an outwardly opening valve at the upper end of the stem, the position of which is controlled according to the position of the needle valve 24 with relation to its seat 25. Where the spindle is provided with the longitudinal by-pass 8, said outwardly opening valve 5ᵃ, 3 seals said passage when the spindle is rotated to unseat the needle valve.

Air under pressure is now forced into the passage 17 from the pump, past the check valve, through the eccentric perforations 20 which are always uncovered by the check valve, and through the passages 21, 22 and 26 to the tire. As soon as sufficient air enters the tire to create a back pressure this pressure will seat the light check valve against its seat 14 on each suction stroke of the pump piston, the valve falling back on to the disc 19 on each compression stroke of the piston to permit the air to pass through the passage 17 into the chamber 13 and thence to the tube 1. The check valve 15 therefore effectively holds the back pressure on each stroke of the pump piston. When the desired pressure in the tire is reached, the needle valve is screwed down so that its tapered end 24 finds its seat 25, thus permanently sealing the passage 26. The pump connections are then removed. With the tire thus inflated the pressure from the tire is carried by the pointed end of the needle valve, thereby removing a strain from the light check valve 14.

When it is desired to renew the check valve 15 the change may be made without losing the pressure of the tire by removing the valve and seat from the open end of the needle valve stem and substituting a new valve and seat which may be furnished in accordance with the usual practice.

When it is desired to deflate the tire, the needle valve is unscrewed sufficiently far to uncover the passage 26 but not enough to bring the tapered shoulder of the groove 5' against the inturned end of the stem 2. The air from the tire escapes through the by-pass 8 of which there may obviously be more than one, and through the passage 21 past the check valve.

Various modifications may obviously be made in the form of the check valve and in the use and construction of the needle valve, all without departing from the spirit of my invention if within the limits of the appended claims.

What I therefore claim and desire to secure by Letters Patent is:—

1. A valve comprising a hollow stem having an inturned portion near one end adapted to provide a seat for a spindle, a longitudinally bored spindle adjustable in said stem, a valve on said spindle adapted to control the passage of air through said stem, said spindle having an annular reduced portion of sufficient length to permit opening and closing of said valve and said spindle below said reduced portion being formed as a valve for cooperation with the seat provided by the inturned portion of said stem, there being a longitudinal deflating passage between said spindle and stem sealed when the spindle is adjusted to seat against the seat provided by said inturned portion of the stem.

2. An inflation valve comprising a stem having a longitudinal bore, a seat within said bore, a spindle having a passage for air and adjustably mounted within said bore, an inwardly opening check valve in said passage, a valve on said spindle and adapted to find said seat, a longitudinal vent along said spindle, said spindle having an annular groove about it adjacent to the end of said valve stem, said groove terminating at its lower edge in a tapered shoulder and the end of said valve stem being inturned to enter said groove and to abut said tapered shoulder when said spindle is retracted.

3. A valve for use with tires or the like, comprising a hollow stem having a seat for a valve near its inner end and having its outer end formed as a sealing element, a spindle adjustable in said stem and having a portion formed for cooperation with said sealing end, a valve on the inner end of said spindle adapted to cooperate with said seat to control the passage of air through said stem and the spindle having an inflating passage connecting with the interior of the tire or the like when the spindle is adjusted to unseat the valve there being a deflating passage between the spindle and stem connecting with the interior of the tire or the like when said valve is unseated but sealed against loss of pressure by the cooperation of the co-acting portion of the spindle with the outer end of the stem.

4. A valve comprising a hollow stem member, a spindle adjustably mounted therein, and having a longitudinal passage for the vent pressure, a valve on said spindle controlling the passage of pressure through the stem, said spindle having a reduced portion of a length sufficient to permit the opening and closing of said valve and itself constituting a valve for said vent passage, and said stem having a portion turned into said reduced portion.

In testimony whereof I affix my signature.

CHARLES R. C. BORDEN.